(12) United States Patent
Villanueva Montero

(10) Patent No.: US 8,528,864 B2
(45) Date of Patent: Sep. 10, 2013

(54) PROTECTION DEVICE FOR SENSITIVE AREAS AGAINST IMPACT OF FOREIGN OBJECTS

(75) Inventor: Rafael Villanueva Montero, Alcala de Henares (ES)

(73) Assignee: Airbus Operations, S.L., Madrid (ES)

( * ) Notice: Subject to any disclaimer, the term of this patent is extended or adjusted under 35 U.S.C. 154(b) by 0 days.

(21) Appl. No.: 13/526,080

(22) Filed: Jun. 18, 2012

(65) Prior Publication Data

US 2013/0119201 A1    May 16, 2013

Related U.S. Application Data

(63) Continuation of application No. PCT/ES2010/070691, filed on Oct. 26, 2010.

(30) Foreign Application Priority Data

Dec. 18, 2009  (ES) .................................. 200931203

(51) Int. Cl.
*B64C 1/00*    (2006.01)

(52) U.S. Cl.
USPC ........................ 244/129.1; 89/36.04; 89/36.02

(58) Field of Classification Search
USPC ................. 244/129.1; 89/36.09, 36.04, 36.02
See application file for complete search history.

(56) References Cited

U.S. PATENT DOCUMENTS

| | | | | |
|---|---|---|---|---|
| 2,553,512 A | * | 5/1951 | Cotton, Jr. ...................... | 55/306 |
| 2,969,941 A | * | 1/1961 | Hobart, Jr. ...................... | 55/306 |
| 3,871,844 A | * | 3/1975 | Calvin, Sr. ...................... | 55/306 |
| 4,813,334 A | * | 3/1989 | Bloks et al. .................. | 89/36.02 |
| 5,180,880 A | * | 1/1993 | Zufle ............................ | 89/36.02 |
| 5,622,336 A | * | 4/1997 | Chavanne et al. .......... | 244/129.1 |
| 5,811,719 A | * | 9/1998 | Madden, Jr. ................ | 296/146.7 |
| 5,939,658 A | * | 8/1999 | Muller ......................... | 89/36.04 |

(Continued)

FOREIGN PATENT DOCUMENTS

| | | |
|---|---|---|
| DE | 195 45 806 A1 | 8/1996 |
| EP | 0 740 125 A2 | 10/1996 |
| ES | 2 288 309 | 1/2008 |

OTHER PUBLICATIONS

International Search Report mailed on Feb. 23, 2011, issued for International Application No. PCT/ES2010/070691, filed on Oct. 26, 2010 (with partial English translation).

(Continued)

*Primary Examiner* — Christopher P Ellis
*Assistant Examiner* — Medhat Badawi
(74) *Attorney, Agent, or Firm* — Oblon, Spivak, McClelland, Maier & Neustadt, L.L.P.

(57) ABSTRACT

A protection device includes a flexible laminar body resistant to impacts, arranged separately from the body to be protected and put in the way of the beam of possible trajectories with which a foreign object could impact on the object to be protected, and it includes a plurality of energy absorption elements, provided with device clamping elements over a support structure positioned outside of the beam of possible trajectories, in order for the flexible laminar body to intercept an impact trajectory by the foreign object, resulting in its deformation and the subsequent progressive extension of the energy absorption elements reducing the loads to be supported by the support structure. The protection device is applied to prevent birds or other objects from impacting on sensitive areas of aircraft. The protection device is of a textile nature of reduced weight.

8 Claims, 6 Drawing Sheets

(56) References Cited

U.S. PATENT DOCUMENTS

| | | | |
|---|---|---|---|
| 6,298,766 B1 * | 10/2001 | Mor | 89/36.04 |
| 6,588,705 B1 * | 7/2003 | Frank | 244/118.5 |
| 6,807,890 B1 * | 10/2004 | Fuqua | 89/36.02 |
| 7,004,430 B2 * | 2/2006 | Weekly | 244/129.1 |
| 7,389,718 B1 * | 6/2008 | Carter et al. | 89/36.02 |
| 7,887,610 B2 * | 2/2011 | Pavlatos | 55/306 |
| 8,039,102 B1 * | 10/2011 | Lavature et al. | 428/343 |
| 2004/0255769 A1 * | 12/2004 | Drackett | 89/36.09 |
| 2008/0256686 A1 * | 10/2008 | Ferrara | 2/413 |

OTHER PUBLICATIONS

International Written Opinion mailed on Feb. 23, 2011, issued for International Application No. PCT/ES2010/070691, filed on Oct. 26, 2010.

\* cited by examiner

PROTECTION DEVICE FOR SENSITIVE AREAS AGAINST IMPACT OF FOREIGN OBJECTS

OBJECT OF THE INVENTION

The present invention, as expressed in the title of this specification, relates to a device that is envisaged for protecting sensitive areas which a foreign object can impact, such that the integrity of the sensitive areas is preserved, maintaining their functionality even in the case where an impact by a foreign object occurs.

The main object of the invention consists of providing a device of reduced weight and easy installation that is interposed in the beam of possible trajectories with which the foreign object could impact on the object to be protected, and all this in such a way that in the case of intercepting the trajectory of a foreign object, it progressively absorbs its energy preventing it from impacting against the element to be protected, or if it does come to impact it, it would do so with a minimum energy so as not to result in damaging the protected object, while said progressive energy absorption preserves the structure wherein the device is clamped.

The invention is applicable in any industrial sector where it is required to protect an area on which foreign objects could impact, such that the damages in said protected area are prevented, and more specifically, the invention is applicable in the aeronautical sector in order to protect sensitive areas of the aircraft that could endanger the integrity thereof.

BACKGROUND OF THE INVENTION

The evolution of aircraft architecture has led to the inclusion of an increasing number of kits for the management of flight controls, communications and other missions inside the aircraft. At the same time, the improvement in estimating and calculating the loads that the aircraft will support during its lifespan as well as the improvement in calculating the structures and the characterization and quality of the materials have caused the reduction of its weight which allows increasing the useful load of the aircraft or the fuel that it can support, but as a counterpart this weight reduction of the structure involves a lower tolerance to the damage thereof.

Since there is a given probability of impacts of foreign objects occurring on aircrafts, particularly birds at high speed, that can endanger the integrity of the aircraft and, accordingly, of the payload, the persons and goods that are inside. For this reason, the aeronautical regulations demand that the vital elements of the aircraft are protected so there is no possibility of impact or, failing that, being able to directly support the impact.

Thus, to avoid damages to the aircraft sensitive parts, the element to be protected can be reinforced in order to be able to support the effect of the impact of a foreign object and to continue performing its mission until it can be repaired or substituted, or there is also the possibility of interposing in the path of the element to be protected some element capable of preventing the direct impact of the foreign object against it. In both cases, the conclusion of the analysis assumes the reinforcement of the element to be protected, adding elements outside of the element, or the reinforcement of some element that is in the path of the object that will impact. This reinforcement involves in all cases an increase in the total weight of the aircraft to the detriment thereof, reducing its features and/or profitability.

It should be noted that besides birds, there are other elements that can impact on the aircraft vital elements. Among these elements are, i.a. the cases wherein an explosion of the tire of the wheels "Rim Release" occurs, or even detachments of objects "Blade Release" whether from the motor, propeller turbine or from the electricity/hydraulic generator emergency system.

In all previous cases, the common denominator is that there is an element with a mass, following a known path and at high speed, whereby the fulfillment of the protection requirement of the sensitive elements is feasible to be fulfilled.

DESCRIPTION OF THE INVENTION

In order to achieve the objectives and fulfill the current regulations, the invention provides a new device that carries out the protection of sensitive areas against the impact of a foreign object; characterized in that it comprises a flexible laminar body made of impact resistant material which is arranged separately from the object to be protected and put in the way of the beam of possible trajectories with which the foreign object could impact said object to be protected. The flexible laminar body includes a plurality of energy absorption elements which in turn are provided with device clamping elements in a structure positioned outside of the beam of possible trajectories with which the foreign object could impact on the object to be protected.

This configuration presents the great advantage that the device intercepts the impact trajectory of a foreign object by means of the laminar body, which by presenting a flexible nature, when intercepting a foreign object, is deformed and by including energy absorption elements, upon the deformation of the laminar body, the subsequent progressive extension of the energy absorption elements is produced which allows absorbing the energy of the impacting object without resulting in higher loads on the structure wherein it is supported, preventing producing damages therein.

In the preferred embodiment of the invention, the flexible laminar body is of a textile nature, e.g. it can be made of kevlar or another similar material, presenting a high resistance against impacts while at the same time it is flexible and adapts to the shape of a foreign body when it impacts on it.

Moreover, the separation of the flexible laminar body with regard to the body to be protected is at least equivalent to the deformation undergone by the flexible laminar body plus the extension produced in the energy absorption elements, such that if there is an impact of a foreign object against the flexible laminar body, the impact against the body to be protected is prevented from occurring.

In order to perform the attachment of the clamping elements provided for in the energy absorption elements, it is envisaged that the support structure wherein said attachment is performed comprises some hooking elements wherein the clamping elements provided for in the energy absorption elements are retained.

The function of the energy absorption elements is that of transforming the energy of the impacting element (in the form of velocity and mass) into point forces on the hooking elements provided for in the support structure wherein the device is clamped. The force of the hooking elements is limited by means of analysis at levels that do not result in permanent damage to the receptor structure.

For that purpose, the best combination among the energy absorption elements, the distance between the flexible laminar body and the object to be protected and the rigidity of the support structure wherein the device of the invention is clamped, must be determined.

The invention envisages that the energy absorption elements can be textile, mechanical or hydraulic. In the preferred embodiment of the invention, said energy absorption elements are of a textile nature and are constituted by strips, each one constituted by segments superimposed in zigzag, which are clamped from the side of the flexible laminar body toward its interior and provided with seals which are progressively broken when an impact of a foreign object occurs over the flexible laminar body. Said seals, for example, can be determined by transverse seams made over the strips arranged in a zigzag pattern.

The clamping elements provided for in the energy absorption elements are of the quick release/hooking type, e.g. they can be snap hooks or similar, capable of supporting the loads produced by the impact, providing an easy and quick installation of the device in the required place, as are the hooking elements of the support structure clamped thereof.

Moreover, the flexible laminar body and the energy absorption elements are located inside a bag from which the clamping elements of the device to the structure emerge so that the device is protected by the bag from which only the anchoring snap hooks on the hooking elements provided for in the structure overhang, which considerably simplifies and contributes to the set up of the device onto said structure.

This configuration prevents the damage to the device by external agents or by the mishandling thereof. Thus the use of the protection bag reduces the probability of failure because of handling or deterioration and, accordingly, the effectiveness of the invention is increased.

Next, in order to facilitate a better understanding of this specification, and forming an integral part thereof, a series of drawings in which the object of the invention has been represented with an illustrative and not limitative manner is attached.

BRIEF DESCRIPTION OF THE DRAWINGS

In FIG. 9 the door of the landing gear is open to simplify the figure.

DESCRIPTION OF THE PREFERRED EMBODIMENT

Figure 1:
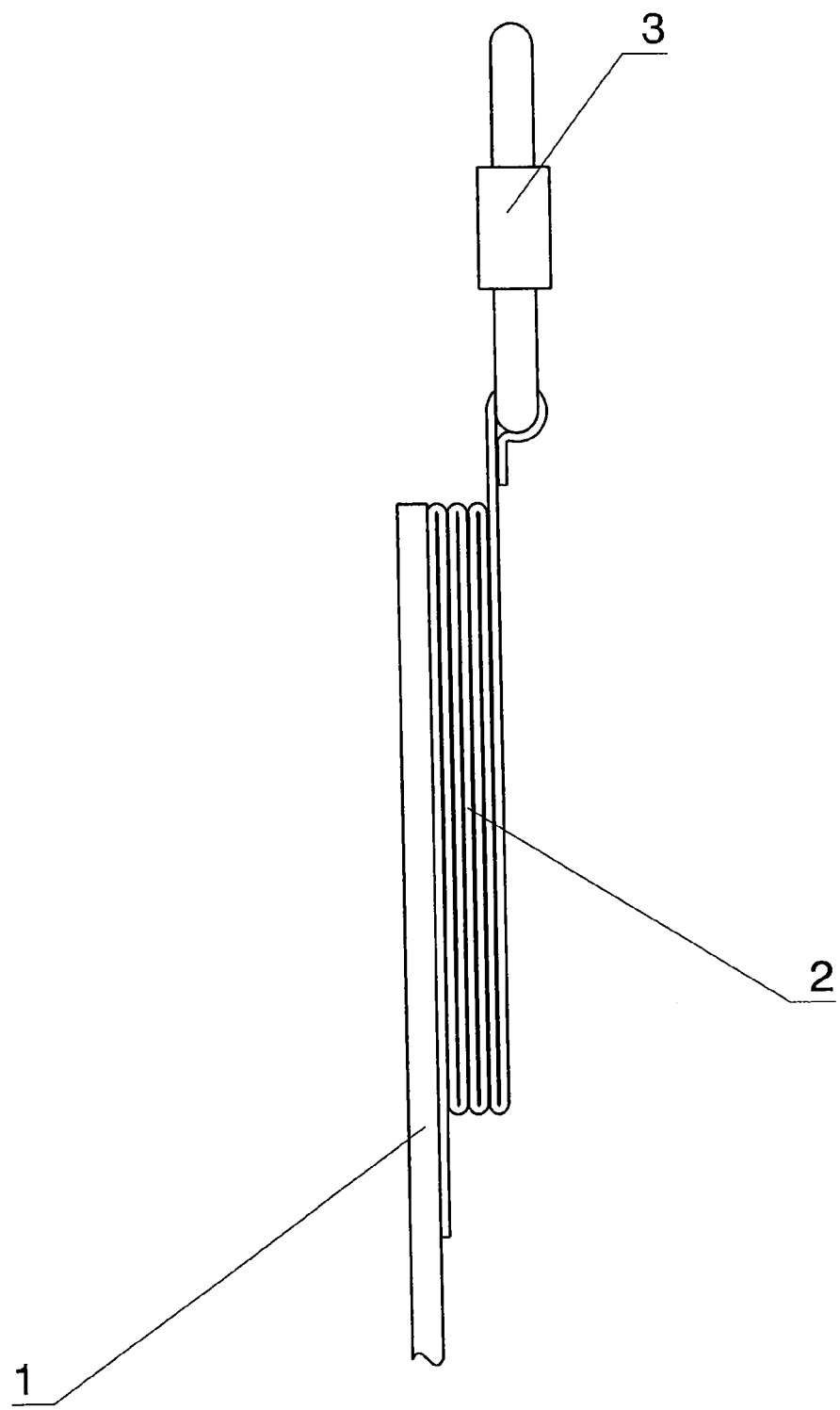
FIG. 1.—Shows a schematic perspective view of a possible embodiment of the device of the invention. In addition, a detail of the configuration of the energy absorption element is shown.
Figure 2:
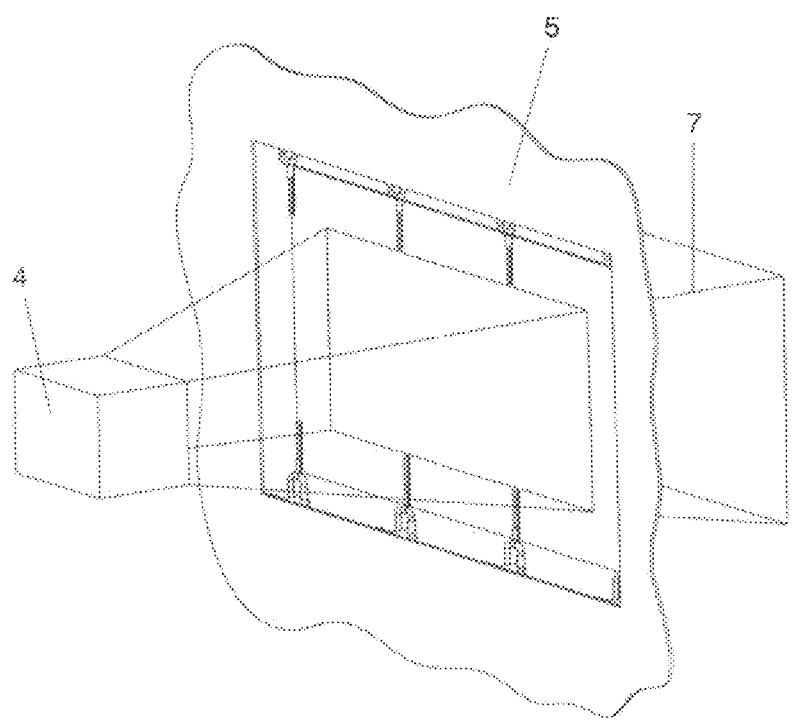
FIG. 2.—Shows a schematic perspective veiw of the installation of the device of the invention represented in the previous figure over a structure in order to carry out the protection of the element to be protected.

Referring to the numbering adopted in the figures, the device of the invention comprises a flexible laminar body 1 resistant to impacts which is of a textile nature, for example, Kevlar, wherein a series of energy absorption elements 2 are clamped, which are likewise of a textile nature and are constituted by strips 2, each one constituted by superimposed segments in zigzag and sewn to the flexible laminar body 1. A clamping element 3 is arranged at the end of the strip, constituted by a snap hook in order to allow performing the clamping of the device to a support structure 5 that remains separated from the object to be protected 4, for which said support structure 5 includes some hooking elements 6 wherein the snap hooks 3 are clamped in a quick and simple manner which facilitates the assembly operation of the device, since it is only required to anchor the snap hooks onto the hooking elements 6. This configuration is also very useful in order to facilitate the removal of the device of the invention after having carried out its mission in order to allow positioning a new device.

The hooking elements 6 are assembled in such a way that the different snap hooks 3 are matched up with the hooking elements in the totally extended position of the flexible laminar body 1. It is also possible that said hooking elements 6 are not located at the required distance, for which at the end of the strips 2, tensor elements allowing regulating the separation of the snap hooks 3 in relation to the flexible laminar body 1 are provided for, which allows installing the device of the invention on the support structure 5 wherein the hooking elements 6 have not been arranged with the required precision (not shown).

The support structure 5 should be outside the beam 7 of the possible trajectories with which the foreign object 8 could impact the object to be protected 4, so that, by installing the device of the invention, it is arranged covering the beam of possible trajectories 7 that the foreign object 8 could acquire.

The beam of possible trajectories 7 is experimentally known by the result of risk analysis based on previous experience on other aircrafts and on simulations where the invention will be installed. The risk analyses of impacts of foreign objects are compulsory in order to certify an aircraft, and the reliance on the results obtained is high. This means that the knowledge of the beam of possible trajectories 7 of foreign objects is well known and it can be predicted with relative ease with the available means nowadays.

Figure 3:
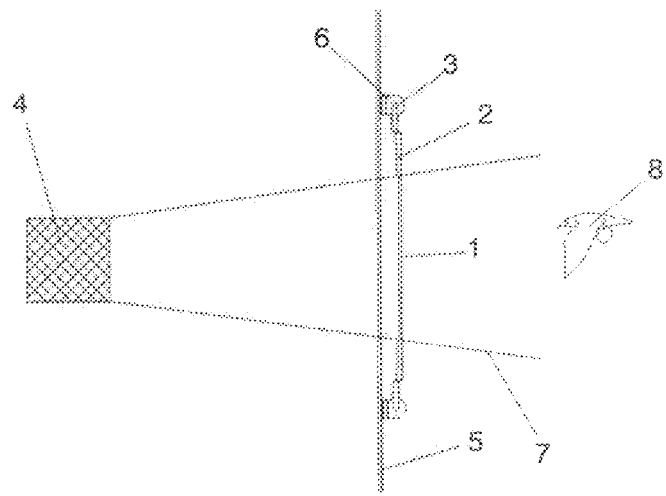
FIGS. 3 to 6.—Show a side view equivalent to the previous figure of the different stages of the device operation when an impact of a bird is produced thereon.
Figure 4:
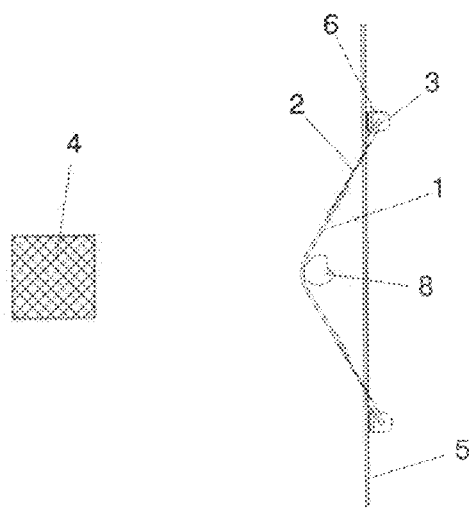
Figure 5:
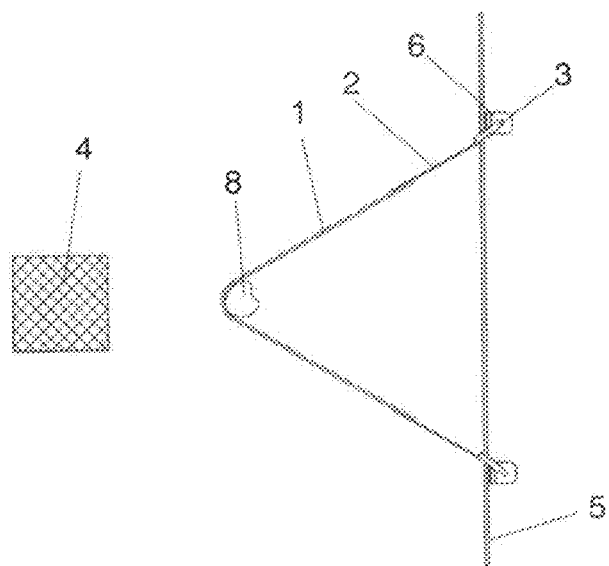
Figure 6:
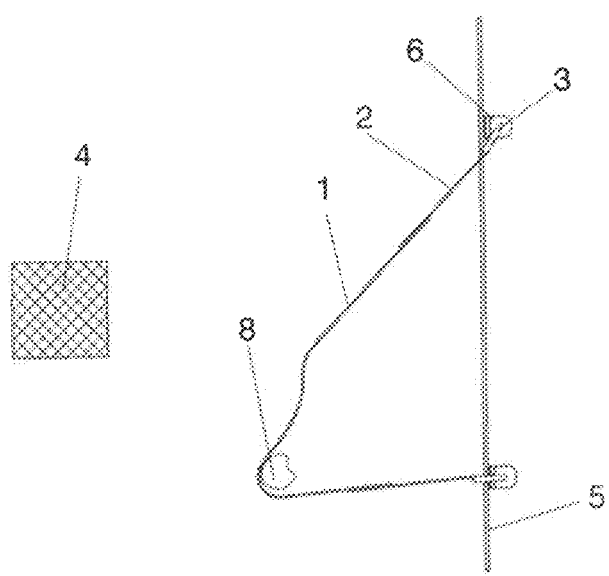

The invention operation is shown in FIGS. 3 to 6, wherein the foreign object 8 is a bird that is flying within the beam of possible trajectories 7, as it is shown in FIG. 3, which means that the bird 8 impacts against the flexible laminar body 1 which is deformed resulting in the tension of the energy absorption element strips 2, which causes the tearing of the seals constituted by the transverse stitches (not shown) of the strips of said energy absorption elements 2, these extending until their maximum length as is depicted in FIGS. 4 and 5, so that, after having carried out the complete braking of the bird 8, the device will remain as shown in FIG. 6, situation where the removal of the device is carried out by releasing the snap hooks 3 of the hooking elements 6, thus allowing the assembly of a new device.

Figure 7:
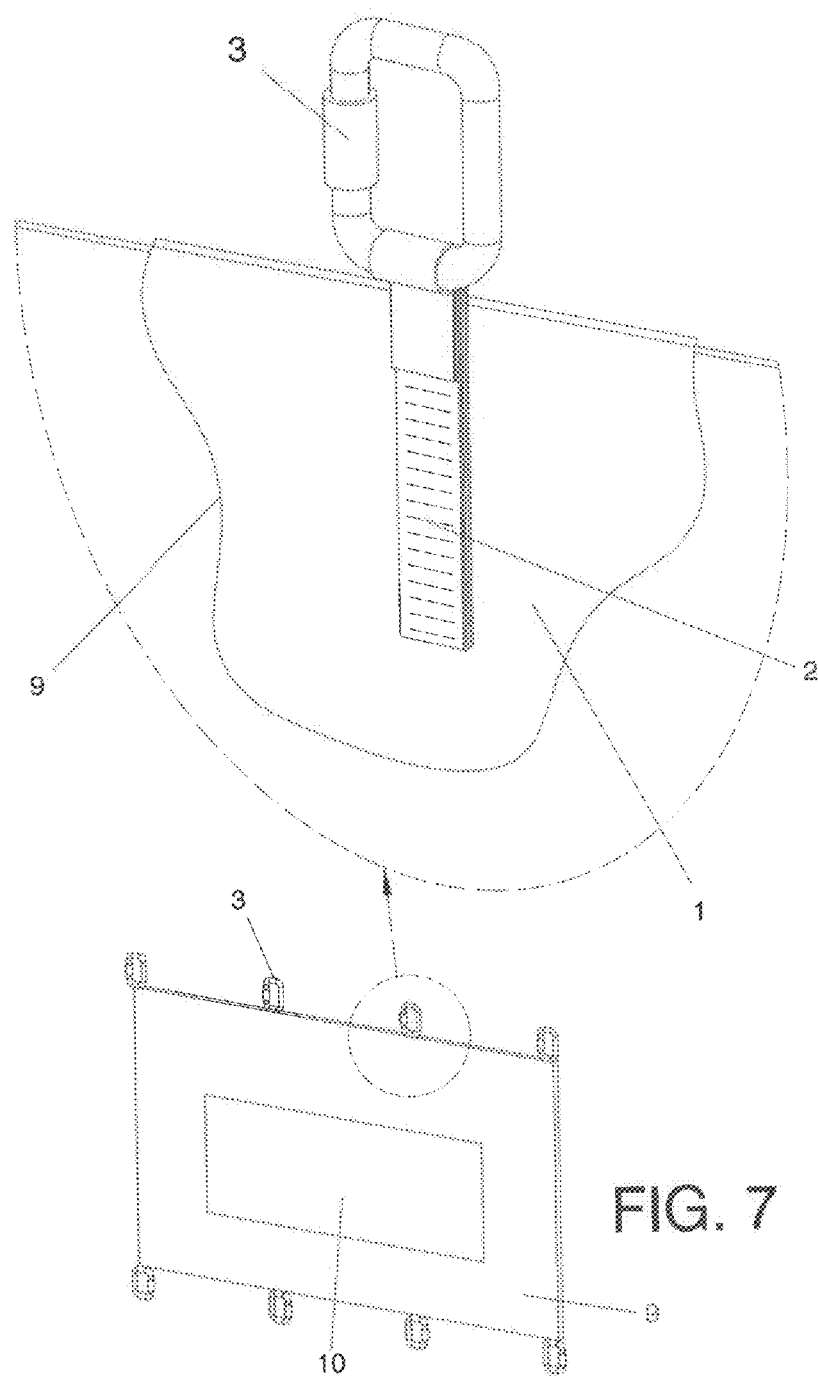
FIG. 7.—Shows a schematic perspective view of the device of FIG. 1 housed in a protection bag that facilitates its handling and installation.

In FIG. 7, the device of FIG. 1 is shown, but with the particularity that it is housed in a bag 9 with the mission of preventing the flexible laminar body 1 and the strips 2 superimposed in zigzag to be affected by the adverse environmental conditions that could deteriorate the invention and diminish the protecting characteristics thereof. The bag 9, depending on the area where the device of the invention is going to be installed, has to present protection characteristics against external agents (water, fuel, hydraulic liquids, etc.), and against environmental conditions (temperature, air flows, etc.). The bag is completely closed preventing access to the internal elements thereof, and the only elements that are outside of the bag are the snap hooks 3 that clamp the protection device. This configuration facilitates the installation and disassembly of the protection device, as it has already been described.

Figure 8:
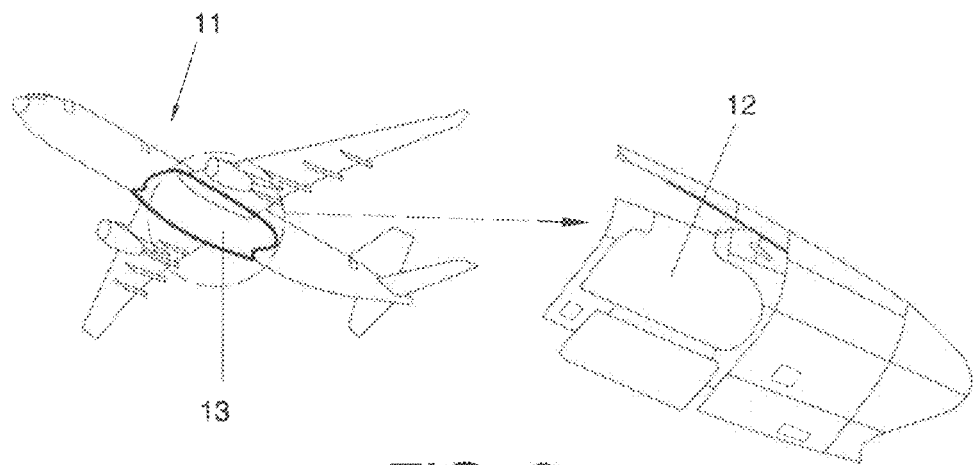
FIGS. 8 and 9.—Represent a possible example of application of the device of the invention on an aircraft, in order to carry out the protection of the mechanism which maintains the door of the main landing gear closed.
Figure 9:
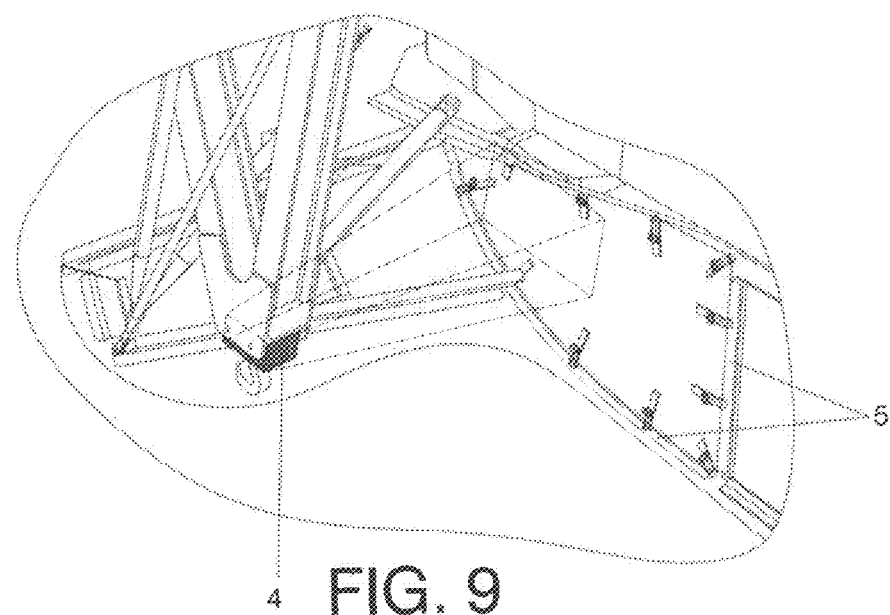

In the bag 9 there is a label 10 wherein the device identity label is included such as, e.g. it could be a designation and/or a reference, the serial number, expiry date (if applicable), assembly instructions, safety instructions, etc. In FIGS. 8 and 9, an application example of the invention on an aircraft 11 is described for the protection of the locking hook 4 ("uplock"), which is the door 12 locking hook of the main landing gear positioned on the belly fairing 13 of the aircraft 11.

The locking hook 4 is not protected by the fuselage, so it is placed inside the beam of possible trajectories 7 of birds 8 that can impact thereon during landing and takeoff operations as well as in cruising conditions of the aircraft 11.

The locking hook 4 is a vital element in the extension/retraction system of the landing gear. It is the one in charge of maintaining the door in a closed position. In FIG. 9, the door 12 is open to simplify said figure. In the case of failure of the locking hook 4, there is the risk of the door locking the lowering of the landing gear preventing the correct deployment thereof and, accordingly, the integrity of the aircraft and its passage are endangered.

Even though there are redundant operating systems, it is not possible to ensure that the locking hook 4 supports a direct impact of a bird 8 or another foreign element, and continues to operate correctly. For this reason, it is necessary to protect it by means of some element outside of it in order to prevent all possible risk.

In this example the support structure 5 of the aircraft 11 is positioned in front of the locking hook 4 to be protected and completely covering the beam of possible trajectories 7 in such a way that between the flexible laminar body 1 and the locking hook 4 there is enough distance for the invention to act in a correct manner, as has been previously described, and preventing the transmission of high loads to the support structure 5.

In the case of an impacting bird 8, or any other object, the locking hook 4 will remain intact and the aircraft can continue operative until the damage is repaired by means of the removal of the affected panels forming the external surface of the belly fairing 12 as well as the removal of the device of the invention, which is not reusable. Due to the invention operation previously described, the support structure 5 will not have undergone damages, since the loads that are produced are minimized due to the energy absorption effect of the invention. Next, new panels are placed or the damages will be repaired and a new device of the invention is placed. In this way, the protection capacity will be restored rendering the aircraft in optimal operating conditions without the need for carrying out costly and laborious inspections in order to ensure the absence of damage to the support structure of the invention.

The invention claimed is:

1. A protection device for sensitive areas against impact of foreign objects, said device comprising:
a flexible laminar body made of a material resistant to impacts, said body being arranged separately from an object to be protected and put in the way of a beam of possible trajectories with which a foreign object could impact over said object to be protected, wherein said body includes a plurality of energy absorption elements selected among textile, mechanical and hydraulic elements, such that the energy absorption elements of a textile nature, are strips, each one of which is constituted by segments superimposed in zigzag and clamped to a side of the flexible laminar body and towards its interior, said strips being provided with seals that are progressively broken when an impact of the foreign object on the flexible laminar body occurs;

wherein said energy absorption elements include clamping elements on a support structure located outside the beam of possible trajectories with which the foreign object could impact the object to be protected, said energy absorption elements being configured to intercept an impact trajectory of the foreign object with the flexible laminar body, which results in a deformation of the flexible laminar body and a subsequent extension of the energy absorption elements.

2. A protection device for sensitive areas against impact of foreign objects, according to claim 1, wherein the flexible laminar body is of a textile nature.

3. A protection device for sensitive areas against impact of foreign objects, according to claim 1, wherein the flexible laminar body is separated from the object to be protected a distance which is at least equivalent to the deformation of the flexible laminar body plus the extension of the energy absorption elements.

4. A protection device for sensitive areas against impact of foreign objects, according to claim 1, wherein the clamping elements are quick release/hooking elements.

5. A protection device for sensitive areas against impact of foreign objects, according to claim 4, wherein the quick release/hook elements are snap hooks.

6. A protection device for sensitive areas against impact of foreign objects, according to claim 1, wherein the clamping elements are clamped onto hooking elements provided in the support structure of the protection device.

7. A protection device for sensitive areas against impact of foreign objects, according to claim 1, wherein the flexible laminar body and the energy absorption elements are located inside a bag from which the clamping elements emerge from the protection device to the support structure.

8. A protection device for sensitive areas against impact of foreign objects, according to claim 1, wherein the strips arranged in zigzag comprise tensor elements for adjusting their dimensions to the hooking elements of the support structure.

* * * * *